United States Patent
Brown et al.

(10) Patent No.: US 9,864,641 B2
(45) Date of Patent: Jan. 9, 2018

(54) METHOD FOR MANAGING WORKLOADS IN A MULTIPROCESSING COMPUTER SYSTEM

(71) Applicant: INTERNATIONAL BUSINESS MACHINES CORPORATION, Armonk, NY (US)

(72) Inventors: Alexander Barraclough Brown, West Kirby (GB); Gisle Mikal Nitter Dankel, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 14/312,102

(22) Filed: Jun. 23, 2014

(65) Prior Publication Data
US 2015/0242245 A1   Aug. 27, 2015

Related U.S. Application Data

(63) Continuation of application No. 14/234,260, filed as application No. PCT/IB2012/052984 on Jun. 13, 2012, now abandoned.

(51) Int. Cl.
*G06F 12/02* (2006.01)
*G06F 9/50* (2006.01)
(Continued)

(52) U.S. Cl.
CPC .......... *G06F 9/5088* (2013.01); *G06F 9/5033* (2013.01); *G06F 9/528* (2013.01);
(Continued)

(58) Field of Classification Search
None
See application file for complete search history.

(56) References Cited

U.S. PATENT DOCUMENTS

| | | |
|---|---|---|
| 7,451,183 B2 | 11/2008 | Romero et al. |
| 2003/0217088 A1 | 11/2003 | Takamoto |

(Continued)

FOREIGN PATENT DOCUMENTS

| | | |
|---|---|---|
| CN | 1523498 A | 8/2004 |
| JP | 2004252988 A | 9/2004 |

(Continued)

OTHER PUBLICATIONS

International Application No. PCT/IB2012/052984, International Filing Date Jun. 13, 2012 International Search Report and Written Opinion (ISRWO) dated Oct. 18, 2012.

*Primary Examiner* — Edward Dudek, Jr.
*Assistant Examiner* — Ryan Dare
(74) *Attorney, Agent, or Firm* — Antony P. Ng; Steven L. Bennett

(57) ABSTRACT

A method for managing workloads in a multiprocessing computer system is disclosed. Initially, a set of affinity domains is defined for a group of processor cores, wherein each of the affinity domains includes a subset of the processor cores. An affinity measure is defined to indicate that a given workload should be moved to a smaller affinity domain having fewer processor cores. A performance measure is defined to indicate the performance of a given workload. A given workload is determined based on the affinity measure and the performance measure. In response to a determination that a given workload should be moved to a smaller affinity domain based on the affinity measure, the given workload is moved to a smaller affinity domain. In response to a determination that there is a reduction in performance based on the performance measure, the given workload is moved to a larger affinity domain.

7 Claims, 7 Drawing Sheets

(51) Int. Cl.
*G06F 9/52* (2006.01)
*G06F 12/1072* (2016.01)
*G06F 12/14* (2006.01)
*G06F 12/0815* (2016.01)
*G06F 12/0862* (2016.01)

(52) U.S. Cl.
CPC ...... *G06F 12/0815* (2013.01); *G06F 12/0862* (2013.01); *G06F 12/1072* (2013.01); *G06F 12/1491* (2013.01); *G06F 2212/507* (2013.01); *G06F 2212/602* (2013.01); *G06F 2212/6026* (2013.01)

(56) References Cited

U.S. PATENT DOCUMENTS

| | | | |
|---|---|---|---|
| 2004/0252988 A1 | 12/2004 | Imaoka | |
| 2007/0234365 A1 | 10/2007 | Savit | |
| 2012/0124339 A1* | 5/2012 | Krishnapura | G06F 9/5033 712/216 |
| 2014/0047451 A1* | 2/2014 | Archer | G06F 9/5061 718/104 |
| 2014/0208331 A1* | 7/2014 | Li | G06F 9/5044 718/105 |

FOREIGN PATENT DOCUMENTS

| | | | |
|---|---|---|---|
| JP | 2004288183 A | 10/2004 |
| JP | 4119162 B2 | 7/2008 |
| KR | 20040075693 A | 8/2004 |
| TW | 200500877 A | 1/2005 |

\* cited by examiner

METHOD FOR MANAGING WORKLOADS IN A MULTIPROCESSING COMPUTER SYSTEM

PRIORITY CLAIM

The present application is a continuation of U.S. patent application Ser. No. 14/234,260, filed on Jan. 22, 2014, the contents of which are incorporated herein by reference.

BACKGROUND OF THE INVENTION

1. Technical Field

The present invention relates to multiprocessing computer systems in general, and, in particular, to a method for managing workloads in a multiprocessing computer system.

2. Description of Related Art

In multiprocessing computer systems, the processing cost of accessing data in memory is dependent on the physical location of the memory in relation to the processor that accesses it. Multiple threads that frequently access and modify areas of memory, which are shared with other threads, can benefit from all being physically close together. This reduces the amount of cross-node traffic required to obtain cache lines that exist in the cache of a remote processor. However, placing workloads to increase such cache affinity conflicts with the more general desire to balance work across all available resources of the entire computer system. Furthermore, placing all work onto a single node and allocating all memory locally will increase cache affinity, but in general will not provide good performance for all workloads, due to the increased contention for resources on that node.

Some automatic optimizing systems are arranged to attempt to predict the best placement of workloads based on workload characteristics such as affinity measures, workload size, or resource contention. Such predictive optimizers enable the quick placement of workloads and correspondingly quick performance gains. Workloads that cannot benefit are not affected unless indirectly as a result of changes to associated or linked workloads.

However, the analysis performed by predictive optimizers tend to be complex since there are many possible placements of workloads on different types of domains, complex performance characteristics. In addition, it is difficult to predict the results of workload placements when making large changes or to identify the effects of other workloads. Testings of predictive optimizers are complex and it is difficult to determine that the system is robust. Thus, adequate testing of predictive optimizers needs to be extensive to produce an acceptable level of confidence. Furthermore, a large number of tests may need running every time the heuristics are changed. Predictive optimizers are generally conservative in their optimizations to avoid the possibility of degrading performance.

Other automatic optimizing systems attempt to optimize the placement of workloads through search or experimentation. Such search-based optimizers are able to arrive at near-optimal workload placement given sufficient time and stable performance workloads. Search-based optimizers are relatively simple systems. However, search-based optimizers have high run-time cost due to the high number of possible placement combinations that may require analysis and which increase exponentially with number of workloads. Search-based optimizers may also be disruptive because as long as experimentation occurs, other workloads, as well as the workload under experimentation, may be adversely affected. Search-based optimizers are also reliant on accurate performance measures. Consequently it would be desirable to provide an improved method for managing workloads in a multiprocessing computer system.

SUMMARY OF THE INVENTION

In accordance with a preferred embodiment of the present invention, a set of affinity domains is defined for a group of processor cores, wherein each of the affinity domains includes a subset of the processor cores. An affinity measure is defined to indicate that a given workload should be moved to a smaller affinity domain having fewer processor cores. A performance measure is defined to indicate the performance of a given workload. A given workload is determined based on the affinity measure and the performance measure. In response to a determination that a given workload should be moved to a smaller affinity domain based on the affinity measure, the given workload is moved to a smaller affinity domain. In response to a determination that there is a reduction in performance based on the performance measure, the given workload is moved to a larger affinity domain.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
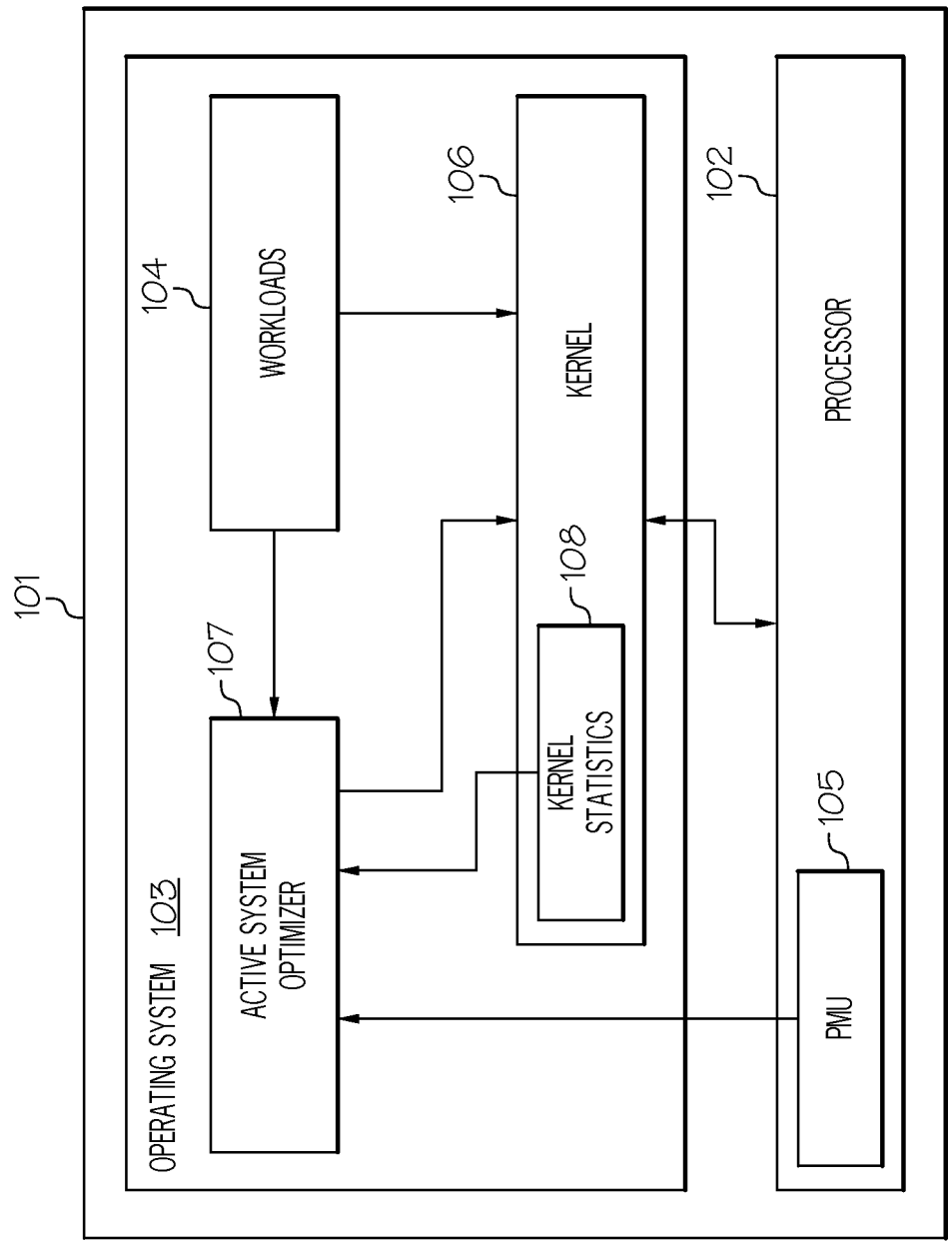
FIG. 1 is a block diagram of a computer having an automatic system optimizing program (ASO)

Referring now to the drawings and in particular to FIG. 1, there is depicted a computer 101 comprises a multiprocessing processor 102 and is loaded with an operating system (OS) 103 arranged to provide a processing platform for one or more application programs in the form of workloads 104. The processor 102 is provided with a performance-monitoring unit (PMU) 105 arranged to monitor a predetermined set of parameters for the processor 102. The OS 103 further comprises a kernel 106 that provides the core functionality of the OS 103 and an active system optimizer (ASO) 107. In the present embodiment, the ASO 107 is a user-space daemon and is arranged to input selected parameters from the PMU 105 and kernel statistics 108 from the kernel 106. The ASO 107 is arranged to optimize the performance of each monitored workload 104 based on the input PMU 105 parameters and kernel statistics 108 as described in further detail below. The input PMU 105 parameters and kernel statistics 108 for the ASO 107 are initially set to default values that may be modified by a system administrator on set-up of the OS 103.

Figure 2:
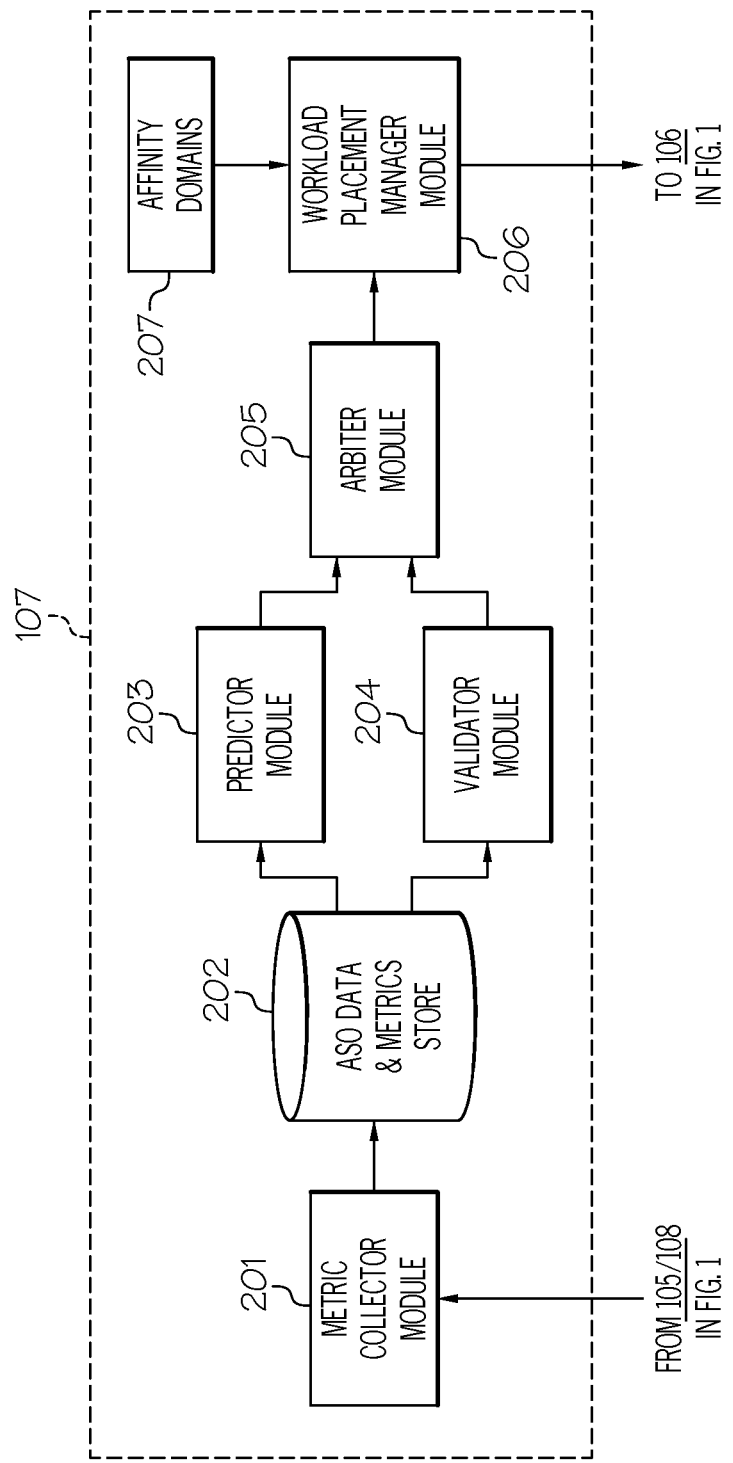
FIG. 2 is a block diagram of the components of the ASO within the computer of FIG. 1.

With reference now to FIG. 2, the ASO 107 includes a metric collector module 201, an ASO data and metrics store 202, a predictor module 203, a validator module 204, an arbiter module 205, a workload placement manager module 206 and a set of affinity domains 207. The affinity domains 207 are predetermined sets or groupings of processor cores defined for the processor 102. An affinity domain may comprise any number of cores from a single processor core to all of the processor cores available. In the present embodiment, each the affinity domains 207 includes a hierarchy based on the respective number of processor cores. In the present embodiment, the processor 102 includes two chips each providing eight cores resulting in a total of sixteen processor cores. The processors 102 are divided into five affinity domains as follows:

i. sixteen fifth-level domains each comprising a respective single core;
ii. eight fourth-level domains each comprising two cores;
iii. four third-level domains each comprising four cores;
iv. two socket-level domains each comprising eight cores; and
v. one book-level domain comprising sixteen cores.

Figure 3A:
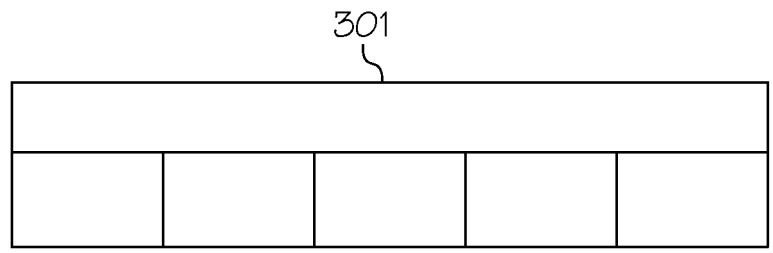
FIG. 3*a* is a table illustrating metric data specification for the ASO of FIG. 2.

The metric collector module 201 is arranged to collect a predetermined set of data in the form of performance data from the PMU 105 and kernel statistics 108 from the kernel 106. The collected data is stored in the ASO data and metric store 202. The data is collected for each workload 104 being monitored. In the present embodiment, with reference to FIG. 3a, the following kernel statistics 108 are collected:

i. Clock cycles spent waiting for data per instruction (CCWD); and
ii. Total clock cycles per instruction (CPI).

The following performance data is collected from the PMU 105:

Rate of executed store instructions (ESI/s).

Each data set is stored in the ASO data record 301 in relation to the relevant workload 104, which is identified by a unique workload identifier (WLID).

Figure 3B:
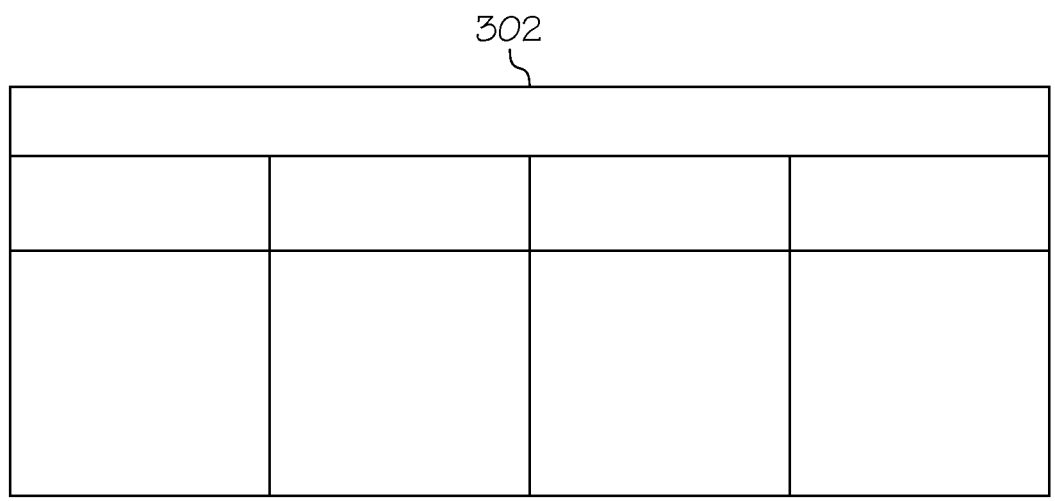
FIG. 3*b* is a table illustrating metric definitions for the ASO of FIG. 2.

Referring now to FIG. 3b, the ASO further comprises a set of metrics 302. The ASO metrics 302 includes an affinity measure (AM) 303 in the form of the ratio of the processor clock cycles spent waiting for data in order to complete instructions to the total number of clock cycles. The AM 303 is associated with an affinity measure threshold, which, in the present embodiment, is 30%. The ASO metrics further comprises a performance measure (PM) 304 in the form of the rate of executed store instructions (ESI/s). The PM 304 is associated with a performance threshold 305, which, in the present embodiment, comprises the peak ESI/s calculated by the ASO 107 for a given workload.

The predictor module 203 is arranged to periodically monitor the affinity measure (AM) 303 for each relevant workload and to compare the AM 303 to the AM threshold of 30%. In the present embodiment, the measurement period is 5 seconds. If the AM 303 for a given measurement period falls below the AM threshold then the predictor 203 is arranged to take no further action. If, however, the AM 303 for a given measurement period meets or exceeds the AM threshold then the predictor 203 is arranged to issue an instruction to the arbiter module 205 recommending that, if possible, the relevant workload be assigned to a smaller one of the affinity domains 207.

The validator module 204 is arranged to work in parallel with the predictor module 203 to periodically monitor the performance measure (PM) 304 for each relevant workload and to compare the PM 304 to the PM threshold 305. As long as the PM 304 for a given measurement period meets or exceeds the PM threshold 305 then the validator 204 is arranged to take no further action. If, however, the PM 304 for a given measurement is less than the PM threshold 305 then the validator 204 is arranged to issue an instruction to the arbiter module 205 recommending that the relevant workload be assigned to a larger one of the affinity domains 207. For a given workload the validator 204 is arranged to calculate the PM threshold as the peak ESI/s and uses this for measuring of the relevant workload 104.

The arbiter module 205 is arranged to arbitrate the instructions received from the predictor 203 and the validator 204 in each data period. If an instruction to assign a given workload to a larger or smaller affinity domain 207 is received from only one of the predictor 203 and the validator 204 then no conflict exists and the instruction is passed on to the workload placement manager module 206. If conflicting instruction to assign a given workload to a larger and smaller affinity domain 207 is received from each of the predictor 203 and the validator 204 then the arbiter 205 is arranged to select an appropriate instruction for forwarding to the workload placement manager module 206. In the present embodiment, in response to such a conflict, the arbiter 205 is arranged to always select the instruction from the validator 204, to assign a given workload to a larger affinity domain 207, for forwarding to the workload placement manager module 206.

In the present embodiment, the workload placement manager module 206 is arranged to manage the measurement period and to instruct the predictor module 203 and the validator module 204 to perform their respective metric measuring at the end of each measurement period. In response to the recommendation from the predictor module 203 or the validator module 204 received via the arbiter module 205, the workload placement manager module 206 is further arranged to determine whether the recommendation can be implemented and if so, instructs the kernel 106 accordingly. In some cases, the workload placement manager module 206 may not be able to implement a recommendation to increase or decrease the affinity domain for a given workload. The workload placement manager module 206 is further arranged to provide a damping factor for each workload being monitored. The damping factor is provided to moderate the frequency at which a given workload can change affinity domains. Generally, the damping factor is arranged to avoid a given workload from returning to a given affinity domain that the workload has only recently moved from.

In the present embodiment, when the workload placement manager 206 places a workload on a bigger affinity domain, the damping factor is set, for the given workload, to a predetermined value. In the present embodiment, the predetermined value is 20. Each measurement period, the damping factor for each workload is reduced by one if it is above zero. The workload placement manager 206 is not permitted to place a workload on a smaller domain as long as the damping factor is above zero, but can place on a bigger domain regardless of damping factor value.

The ASO 107 is arranged to monitor the performance of selected workloads 104 against a predetermined set of metrics 302, in the form of the affinity measure (AM) and the performance measure (PM), in relation to respective predetermined thresholds. If the affinity measure exceeds the affinity measure threshold for a given workload then the ASO 107 instructs the kernel 106 to decrease the size of the affinity domain on which the workload runs. If the performance measure does not meet the performance measure threshold for a given workload then the ASO 107 instructs the kernel 106 to increase the size of the affinity domain on which a the workload runs.

Figure 4:
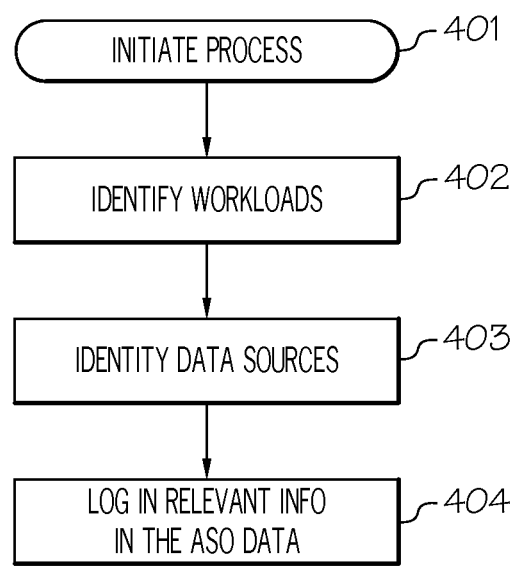
FIGS. 4 to 7 are flowcharts illustrating the processing performed by the ASO of FIG. 2.

The processing performed by the metric collector module 201 will now be described further with reference to the flowchart of FIG. 4. Processing is initiated at step 401 in response to the initialization of the ASO 107 and processing moves to step 402. At step 402, the workloads 104 to be monitored are identified from the ASO data 301 and processing moves to step 403. At step 403, the data sources on which data is to be collected are identified from the ASO data 301 and processing moves to step 404. At step 404, the CCWD, CCPI and ESI/s are logged in the ASO data 301 for each relevant workload and this logging process continues for the duration of the processing of the ASO 107.

Figure 5:
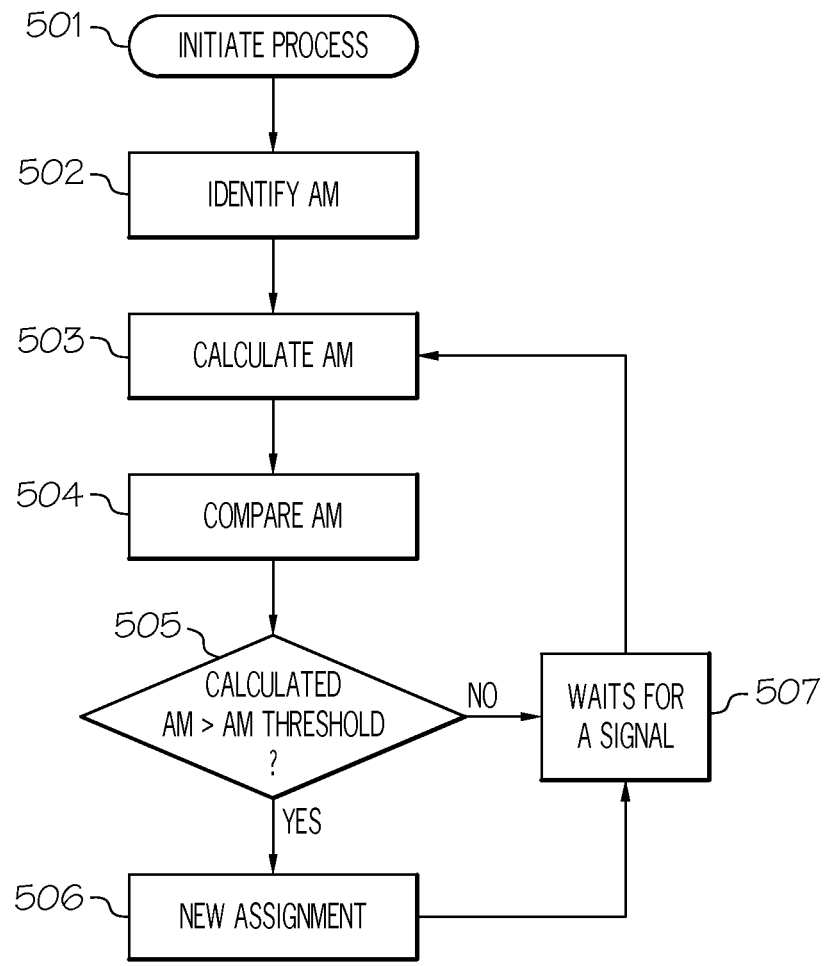

The processing performed by the predictor module 203 will now be described further with reference to the flowchart of FIG. 5. Processing is initiated at step 501 in response to the start-up of the ASO 107 and processing then moves to step 502. At step 502, the affinity measure (AM) for the workloads to be monitored is identified from the ASO metrics 302 and processing moves to step 503. At step 503, the AM is calculated for each monitored workload 104 for the collected ASO data 301, and processing moves to step 504. At step 504, the calculated AM is compared to the AM threshold, and processing moves to step 505. At step 505, if the current calculated AM value exceeds the AM threshold, then processing moves to step 506. At step 506, a recommendation to assign the processing of the relevant workload to a smaller affinity domain is communicated to the arbiter module 205, and processing moves to step 507. At step 507, processing waits for a signal from the workload placement manager module 206 indicating the next data cycle. When such a signal is received processing returns to step 503, and proceeds as described above. If, at step 505, the current calculated AM value does not exceed the AM threshold, then no response is communicated to the arbiter module 205 and processing moves to step 507 and proceeds as described above.

Figure 6:
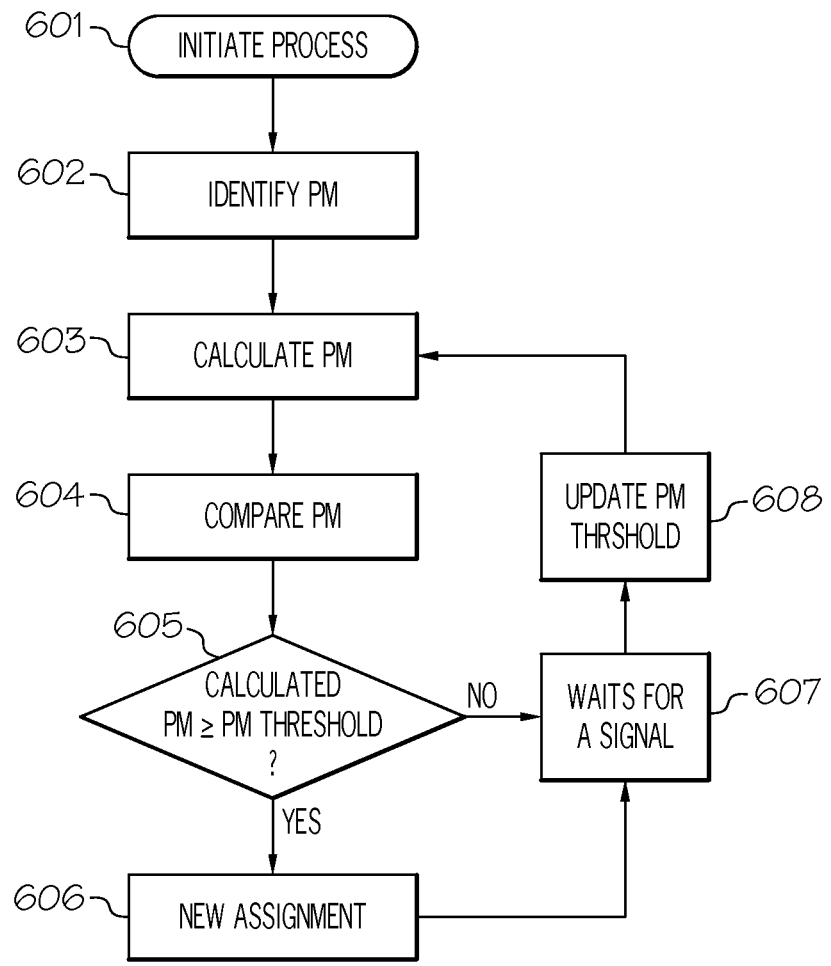

The processing performed by the validator module 204 will now be described further with reference to the flowchart of FIG. 6. Processing is initiated at step 601 in response to the start-up of the ASO 107, and processing then moves to step 602. At step 602, the performance measure (PM) for the workloads to be monitored is identified from the ASO metrics 302 and processing moves to step 603. At step 603, the PM is calculated for each monitored workload 104 for the collected ASO data 301, and processing moves to step 604. At step 604, the calculated PM is compared to the PM threshold, and processing moves to step 605. At step 605, if the current calculated PM value does not match or exceed the PM threshold then processing moves to step 606. At step 606, a recommendation to assign the processing of the relevant workload to a lager affinity domain is communicated to the arbiter module 205, and processing moves to step 607. At step 607, processing waits for a signal from the workload placement manager module 206 indicating the next data cycle. When such a signal is received, processing moves to step 608 to update the PM threshold before returning to step 603 to proceed as described above. If at step 605 the current calculated PM value matches or exceeds the PM threshold, then no response is communicated to the arbiter module 205, and processing moves to step 707 and proceeds as described above.

Figure 7:
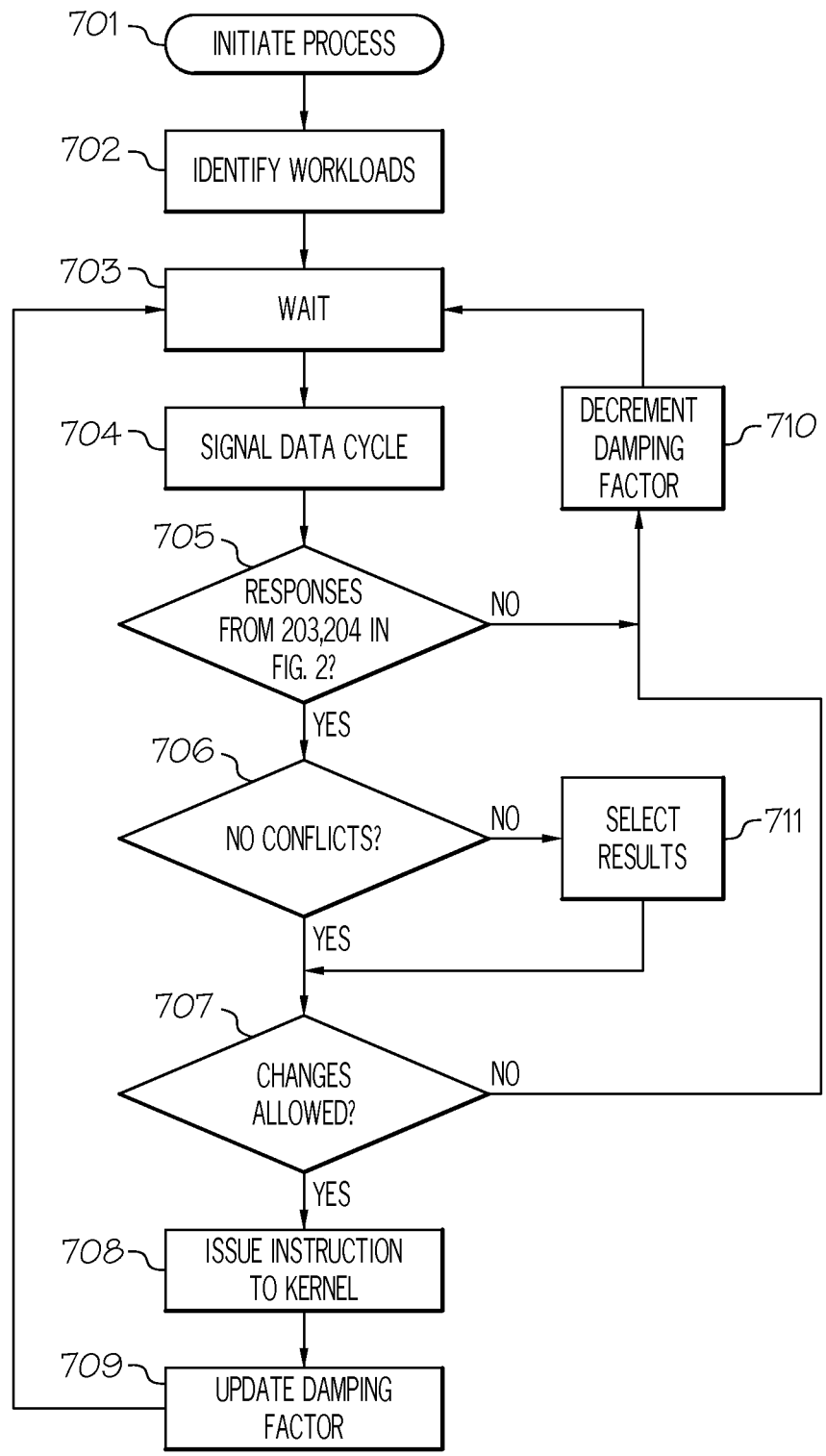

The processing performed by the combination of the arbiter modules 205 and the workload placement manager module 206 will now be described further with reference to the flowchart of FIG. 7 in which steps 706 and 711 comprise the functions of the arbiter module 205. Processing is initiated at step 701 on start-up of the ASO 107 and processing moves to step 702. At step 702, the workloads 104 to be monitored are identified and the subsequent processing is performed for each monitored workload. Processing then moves to step 703 and waits for the predetermined data cycle period to elapse and then moves to step 704. At step 704, the predictor and validator modules 203, 204 are signaled in respect of the data cycle, and processing moves to step 705. At step 705, if results are received from the predictor and validator modules 203, 204, then processing moves to step 706. At step 706, if no conflict exists between the results, then processing moves to step 707. At step 707, the damping factor for the relevant workload is inspected to determine whether any change in affinity domain is permissible and if so processing moves to step 708. At step 708, the relevant instruction is implemented by issuing the appropriate instruction to the kernel 106, and processing moves to step 709. At step 709, the damping factor for the relevant workload is updated to reflect the change in affinity domain, and processing returns to step 703 and proceeds as described above. If, at step 705, no responses are received from the predictor or validator modules 203, 204, then processing moves to step 710 and decrements the damping factor for the relevant workload before returning to step 703 and proceeding as described above. If, at step 706, conflicting results are received, then processing moves to step 711. At step 711, the result from the validator module 203 is selected, and processing moves to step 707 and proceeds as described above. If at step 707, a given workload is not permitted to move as a result of its current damping factor then processing moves to step 710 where the damping factor is decremented before returning to step 703 to proceed as described above.

In another embodiment, the arbiter module is arranged to consider other inputs when resolving a conflict between the predictor and validator modules. In other words, the resolution provided by the arbiter module may be based on a number of factors. In a further embodiment, the functions of the arbiter module and the workload placement manager module may be provided by separate modules.

In a further embodiment, if the ASO finds that it is unable to optimize the performance due to an unsuitable environment, it may be arranged to enter a hibernation mode, and wake-up only when the environment indicates that ASO can offer a performance improvement.

In another embodiment, to make the system less sensitive to small performance variations, averaging of the AM or the PM is performed over a predetermined number of measurement periods. If the averaged AM meets or exceeds the AM threshold for the predetermined number of consecutive periods, then a smaller affinity domain is recommended by the predictor. Conversely, if the averaged PM falls below the PM threshold for the predetermined number of consecutive periods, then a larger affinity domain is recommended by the validator.

In another embodiment, the damping factor is extended with a multiplier factor. When the workload placement manager places a workload on a bigger domain, the damping factor is set to X+old damping factor*multiplier, and the multiplier is then increased by 1 (for example, X=20, initial multiplier=0). The workload placement manager is not permitted to place a workload on a smaller domain as long as the damping factor is above 0, but can place on a bigger domain regardless of damping factor value. Each measurement period, the damping factor is reduced by 1 if it is above 0. The multiplier is reset to 0 when damping factor reaches 0. This will increase the damping factor for workloads that ASO attempts to move frequently, but will still allow workloads that vary more gradually to be moved around.

In a further embodiment, the damping factor is set to a smaller value when moving to a smaller domain and no multiplier is applied. This arrangement reduces the speed of movement towards smaller domains. For example, five measurement periods may be required between each movement from a book affinity domain to a single core affinity domain.

In a further embodiment the frequency of change between affinity domains is limited by delaying the enablement of the predictor and validator and also restricting the period of operation for the predictor and validator.

As will be understood by those skilled in the art, some recommendations from the predictor or validator may not be implementable by the workload placement manager. For example, given two affinity domains comprising a one-core domain and a two-core domain. Two workloads A and B are running. Workload A has already been compressed to the two-core domain and workload B is currently running on all three cores. The predictor may recommend placing workload B on a smaller domain, but the workload placement manager may determine that placing both workloads on the two-core domain is not acceptable, and that both workloads are too big to be placed on only one core. The workload placement manager may therefore be arranged to leave workload A compressed on two cores and workload B running on all three cores.

In a further embodiment, the predictor is arranged to take further metrics into account when determining whether or not to reduce the size of the affinity domain for a given workload. Such further metrics may be arranged to reduce the number of affinity domain change reversals by the validator. For example, a CPI-stack breakdown can be used to weigh potential benefits against potential drawbacks of an affinity domain change.

In another embodiment, the predictor is provided with data identifying non-uniform elements of processor topology. For example, six cores may be provided on one socket and two cores on another. The predictor can be made aware of the topology and take into account the size of the children of the current domain. The predictor is then arranged to communicate a minimum domain size to the workload placement manager so that the workload placement manager can avoid placing it on a domain that is too small.

In a further embodiment, the validator is arranged to keep a history of performance of workloads on each domain. The validator is further arranged to allow for a slight drop in performance, such as 5%, on a given domain without recommending a move back to the previous larger domain. Tolerating a small drop in performance enables a workload to be moved past intermediate domains to reach other domains where performance may be markedly improved. After effectively sampling the performance on a range of affinity domains, the validator may be arranged to use the collected historical performance data to make a recommendation to move to the domain on which the workload performs best. For example, having a damping factor in the downward direction of 3 provides three samples of the performance measure for each affinity domain. Once each level has been sampled the validator is arranged to recommend a move to the affinity domain having the best average performance.

In another embodiment, the validator and predictor are arranged to ensure that the relevant performance related attributes of a workload are stable for a period of time before attempting to optimize the workload. The performance measure, process load and utilization are three possible attributes. After applying an optimization these metrics are then be monitored in the new domain in the same way.

In a further embodiment the ASO is arranged to detect large system events such as the addition of processors or memory, or partition migration events, and may be arranged, in response, to recommend resetting all optimizations.

As will be understood by those skilled in the art, any suitable metrics, statistics or measures may be used to provide the affinity measure and performance measure that are suitable for a given application of the ASO. Furthermore, the definition of the affinity domains may be varied and need not be hierarchical but arranged to suit any given application for the ASO.

Embodiments of the invention may be applicable to single socket systems. For example, it can be beneficial to place threads that have heavy interaction on the same core. Lock contention offers another opportunity where ASO can be of benefit in a single chip environment. Restricting the placement of software threads contending a lock to a subset of available hardware threads can result in a performance improvement.

Embodiments of the invention are arranged to enable quicker and less disruptive placement or workloads than search-based optimizers and are less conservative than predictive optimizers. The predictor prevents movement of workloads that are unlikely to benefit from a change in affinity domain and also generally stops movement towards a smaller domain at the appropriate point. On the other hand, the predictor can be less conservative because the validator will revert any recommendations from the predictor that turned out to be wrong.

Embodiments of the invention are arranged to enable the handling of multiple placements in parallel more efficiently than search-based or predictive optimizers as a consequence of less experimentation moderated by the predictor module. The amount of experimentation needed is greatly reduced over a pure experimentation approach, which may be a particular benefit on a busy system with many workloads. A predictive optimizer faces a highly complex prediction problem when dealing with many workloads at once.

Embodiments of the invention are easier to test and more robust than predictive optimizers. Having two simple components with generally opposite goals using different metrics reduces the testing effort and enables the testing of the two components to be performed in parallel. After a domain move, the predictor module is arranged to collect metrics from the new domain. Thus, the predictor has a simplified job of predicting whether there is a possibility of improved performance on the next domain. This is in contrast to the significant job of predicting which domain will result in best performance.

As has been described, the present invention provides a method for managing workloads in a multiprocessing computer system.

While the invention has been particularly shown and described with reference to a preferred embodiment, it will be understood by those skilled in the art that various changes in form and detail may be made therein without departing from the spirit and scope of the invention.

What is claimed is:

1. A method for managing workloads in a multiprocessing computer system, said method comprising:
    defining a plurality of affinity domains, wherein each of said affinity domains has a different number of processor cores from each other;
    assigning each of a plurality of processor cores to one of said affinity domains;
    monitoring an affinity measure of a workload based on metrics from an active system optimizer;
    monitoring a performance measure of said workload based on metrics from said active system optimizer;
    determining said affinity measure and said performance measure of said workload during operation;
    in response to a determination that said affinity measure exceeds a predetermined affinity domains threshold, moving said workload to one of said affinity domains having fewer processor cores than an affinity domain in which said workload currently resides; and
    in response to a determination that said performance measure exceeds a predetermined performance threshold, moving said workload to one of said affinity domains having more processor cores than said affinity domain in which said workload currently resides.

2. The method of claim 1, further comprising if the result of said affinity measure conflicts with the result of said performance measure, resolving said conflict according to a predetermined protocol.

3. The method of claim 2, wherein said predetermined protocol includes following an indication from said performance measure to move said workload to one of said affinity domains having more processor cores than said affinity domain in which said workload currently resides.

4. The method of claim 1, wherein said defining further includes defining a first affinity domain to have one processor core, a second affinity domain to have two processor cores, a third affinity domain to have four processor cores, a fourth affinity domain to have eight processor cores, and a fifth affinity domain to have sixteen processor cores.

5. The method of claim 1, wherein said performance measure further includes a measure of processing time spent by said workload waiting for data as a proportion of total processing time.

6. The method of claim 1, wherein said performance measure further includes a measure of the rate of execution of store instructions for said workload.

7. The method of claim 1, wherein said determining of said affinity measure and said performance measure is performed periodically.

* * * * *